(12) United States Patent
Steinetz et al.

(10) Patent No.: US 6,702,300 B1
(45) Date of Patent: Mar. 9, 2004

(54) HIGH TEMPERATURE SEAL FOR LARGE STRUCTURAL MOVEMENTS

(75) Inventors: Bruce M. Steinetz, Westlake, OH (US); Patrick H. Dunlap, Jr., Wickliffe, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 118 days.

(21) Appl. No.: 10/046,119

(22) Filed: Jan. 11, 2002

(51) Int. Cl.[7] ............... F16J 15/02; B64D 33/04
(52) U.S. Cl. ............ 277/642; 277/632; 277/644; 277/646; 277/650; 277/930; 60/770; 239/265.11; 239/265.43; 244/131
(58) Field of Search ................ 277/637, 641, 277/642, 644–6, 650, 632, 503, 930; 60/770; 239/265.11, 265.43; 403/363, 381; 244/131, 136

(56) References Cited

U.S. PATENT DOCUMENTS

| | | | | |
|---|---|---|---|---|
| 839,750 | A | * 12/1906 | Graham | .............. 285/343 |
| 2,181,537 | A | * 11/1939 | Schmitter | .............. 464/170 |
| 3,121,995 | A | * 2/1964 | Albani | .............. 60/761 |
| 3,405,957 | A | * 10/1968 | Chakroff | .............. 285/93 |
| 3,568,929 | A | * 3/1971 | Butler et al. | .............. 239/127.1 |
| 3,630,549 | A | * 12/1971 | Grimm | .............. 285/296.1 |
| 3,710,401 | A | * 1/1973 | Goettl | .............. 277/642 |
| 3,869,133 | A | * 3/1975 | Pesendorfer | .............. 277/632 |
| 4,153,280 | A | * 5/1979 | Bunyan | .............. 285/97 |
| 4,415,167 | A | | 11/1983 | Gits |
| 4,468,043 | A | | 8/1984 | Brazel |
| 4,650,441 | A | * 3/1987 | Lepson | .............. 464/16 |
| 4,700,924 | A | | 10/1987 | Nelson et al. |
| 4,848,806 | A | * 7/1989 | Miller | .............. 285/106 |
| 5,014,917 | A | | 5/1991 | Sirocky et al. |
| 5,071,318 | A | | 12/1991 | Bice et al. |
| 5,082,293 | A | | 1/1992 | Steinetz et al. |
| 5,106,129 | A | * 4/1992 | Camacho et al. | .......... 285/233 |
| 5,115,979 | A | * 5/1992 | Ellerhorst et al. | ....... 239/265.37 |
| 5,150,929 | A | * 9/1992 | Greatorex | ................. 285/231 |
| 5,261,676 | A | | 11/1993 | Rockwood |
| 5,288,020 | A | | 2/1994 | Pirker |
| 5,332,239 | A | | 7/1994 | Steinetz et al. |
| 5,445,392 | A | * 8/1995 | Bruckner | .............. 277/345 |
| 5,695,154 | A | * 12/1997 | Castellucci et al. | ......... 244/130 |
| 5,713,522 | A | * 2/1998 | Lundberg | .......... 239/265.39 |
| 5,941,537 | A | | 8/1999 | Wallace et al. |
| 5,951,066 | A | * 9/1999 | Lane et al. | ............... 285/364 |
| 6,039,320 | A | | 3/2000 | MacDonald |
| 6,059,323 | A | * 5/2000 | Ekholm et al. | ............ 285/224 |
| 6,076,467 | A | * 6/2000 | Cespedosa et al. | ......... 102/378 |
| 6,103,341 | A | | 8/2000 | Barz et al. |
| 6,213,431 | B1 | * 4/2001 | Janeke | ................. 244/172 |
| 6,290,182 | B1 | * 9/2001 | Grunditz | ................ 244/161 |
| 6,494,407 | B2 | * 12/2002 | Arulf | ..................... 244/161 |

* cited by examiner

*Primary Examiner*—Alison K. Pickard
(74) *Attorney, Agent, or Firm*—Kent N. Stone

(57) ABSTRACT

A high temperature sealing system is operative to seal an interface between adjacent hot structures and to minimize parasitic flow between such structures that move relative to one another in-plane or out-of-plane. The sealing system may be used to seal thrust-directing ramp structures of a reusable launch vehicle and includes a channel and a plurality of movable segmented sealing elements. Adjacent ramp structures include edge walls which extend within the channel. The sealing elements are positioned along the sides of the channel and are biased to engage with the inner surfaces of the ramp structures. The segmented sealing elements are movable to correspond to the contour of the thrust-directing ramp structures. The sealing system is operative to prevent high temperature thrust gases that flow along the ramp structures from infiltrating into the interior of the vehicle.

32 Claims, 9 Drawing Sheets

HIGH TEMPERATURE SEAL FOR LARGE STRUCTURAL MOVEMENTS

ORIGIN OF THE INVENTION

The invention described herein was made by employees of the United States Government, and may be manufactured and used by or for the Government for Government purposes without the payment of any royalties thereon or therefore.

TECHNICAL FIELD

This invention relates to seals that accommodate relatively large structural movements. Specifically this invention relates to a high temperature sealing system between hot structures that are required to move relative to one another in a thrust-gas-directing environment or other severe service fluid flow environment.

BACKGROUND ART

Advanced aerospace engines and vehicles as well as other applications require sealing systems capable of blocking high temperature fluid flow. Relative movements between components caused by aerodynamic and thermal loads may cause gaps to open. If left unsealed these gaps may allow hot gas and/or unburned fuel to infiltrate into the interior of the vehicle and may cause damage to or loss of the vehicle. Relative thermal growths between components due to temperature gradients and differences in coefficients of thermal expansion between materials can also produce displacements between adjoining elements with changes in temperature. Relative movements may be both in-plane and out-of-plane with respect to adjacent structures. In large components, aerodynamic and thermal loads can cause displacements of up to several inches between adjoining elements. Such conditions require seals that can withstand and block the infiltration of high temperature gases while accommodating large displacements between adjacent structures. An additional requirement in some applications is the ability to seal contoured surfaces including corners. In addition, in some applications it is desirable for such seals to allow for rapid installation and removal of adjoining structures with minimal adjustment or preparation of the sealing structures.

In advanced gas turbine applications temperatures may range up to 2000° F. In such applications braided rope seals comprised of ceramics and superalloys may be used. Thermal barriers comprised of braided carbon fibers are capable of blocking extremely hot (approximately 5500° F.) combustion gases that are produced by solid rocket motors. Such sealing barriers are further capable of dropping the temperature across their transverse dimension by as much as 2500° F. to 2800° F. However, these seal and barrier designs are not capable of accommodating movements of several inches between adjoining elements as may occur in thrust-directing environments in some advanced aerospace engines.

Thus there exists a need for a high temperature sealing system capable of sealing an interface between two relatively movable hot structures. There further exists a need for such a sealing system that will minimize invasive parasitic flow between adjoining elements which may move relative to one another within or out-of-plane by relatively large displacements.

DISCLOSURE OF INVENTION

It is an object of an exemplary form of the present invention to provide a high temperature sealing system.

It is a further object of an exemplary form of the present invention to provide a high temperature sealing system that is capable of sealing the interface between two hot structures.

It is a further object of an exemplary form of the present invention to provide a high temperature sealing system that is capable of minimizing parasitic flow between adjoining structures which move relative to one another in-plane and out-of-plane.

It is a further object of an exemplary form of the present invention to provide a high temperature sealing system that is capable of preventing parasitic flow between adjoining structures which move relative to one another in-plane or out-of-plane by several inches.

It is a further object of an exemplary form of the present invention to provide a high temperature sealing system that seals between adjacent flow-directing structures and which contributes to directing flow in a desired direction.

Further objects of the present invention will be made apparent in the following Best Modes for Carrying Out Invention and the appended claims.

The foregoing objects are accomplished in one exemplary embodiment of the invention by a sealing system for a thrust-directing system in an aerospace vehicle. The sealing system w includes a channel. The channel spans a gap that extends between the edges of two adjacent hot structures that operate to direct hot thrust gas used to propel the vehicle. The channel and adjacent structures are configured such that transversely extending edge walls of the thrust directing structures extend within the channel in both the non-displaced and displaced positions of the adjacent structures. The channel is bounded by side walls and a bottom wall. The channel side walls overlap the edge walls of the adjoining structures. The edge walls of the adjacent structures and the side walls and bottom wall of the channel are sized to enable several inches of displacement of the adjoining structures both in-plane and out-of-plane. Baffles or dams of appropriate height may be placed in the channel where necessary to prevent adverse pressure gradients in the channel from driving flow in the channel in a direction opposite to the thrust direction.

The exemplary embodiment of the present invention further includes flexible sealing elements located along the outboard sides of the side walls bounding the channel. These sealing elements are implemented as pressure seals to prevent leakage between the channel and the adjacent hot structures. In the exemplary embodiment the sealing elements are axially segmented to allow them to conform to the contour of the adjacent structures and provide a generally fluid tight seal.

In some exemplary embodiments, the limited flow into the narrow passage between the edge walls of the thrust directing structures may be sufficiently low so that there is no need for a separate mechanism for cooling of the hot gases that flow into the channel. For higher temperature environments, the sealing system can be cooled using internal cooling passages or conduits that extend in the structures that form the channel. For example the passages may be comprised of one or more conduits running through the base of the channel. Coolant such as turbomachinery generated exhaust gas or hydrogen gas can be directed through the conduits to cool and protect the sealing structures from damage due to the heat of the thruster flow gases. In other exemplary embodiments, the channel may include coolant apertures which are operative to direct coolant to flow from the coolant conduits into the channel cavity. Coolant gas that has passed through the apertures mixes with the relatively higher temperature gases from the thruster flow. In this manner, the coolant gas is operative to cool the hot gases passing through the channel. This exemplary embodiment may also provide a convenient method of disposing of turbomachinery generated exhaust gas.

In some exemplary embodiments the channel may be comprised of monolithic or composite ceramic, carbon-carbon composites, carbon/silicon carbide, superalloy metals, oxidedispersion strengthened metals, gamma titanium aluminide, or other high temperature materials. The channel may further include coatings that provide thermal and environmental resistance for the channel materials against oxidation, hydrogen reaction, and other reactions. Such coatings in exemplary embodiments may include alumina, zirconia, yttria-stabilized zirconia, hafnium carbide, hafnium diboride, silica, silicon nitride, and silicon carbide. In further alternative embodiments heat resistant space shuttle tiles may be applied to the channel and/or to the adjacent gas flow directing structures to protect them from heat and abrasion.

The flexible sealing elements in exemplary embodiments of the present invention may be spring loaded to biasingly maintain sealing engagement with the bounding wall of the adjacent structures. Alternatively or in addition, the sealing elements may be pneumatically loaded by directing high-pressure gas into a cavity adjacent to the sealing elements. In alternative embodiments sealing elements such as ceramic wafers, braided rope seals, plunger seals, or inflatable seals could be used in the sealing system.

BEST MODES FOR CARRYING OUT INVENTION

Figure 1:
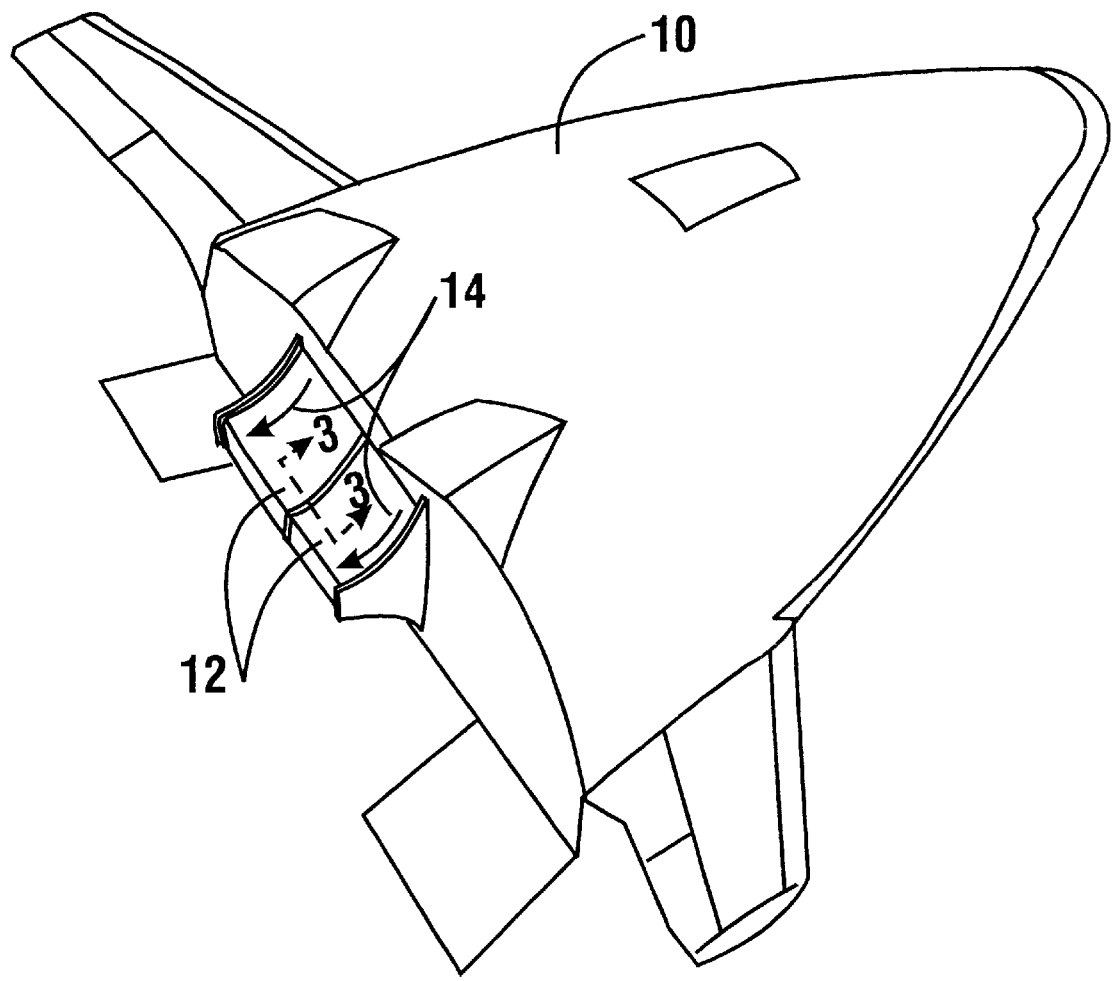
FIG. 1 is a perspective view of exemplary ramp nozzles on a reusable launch vehicle.

Referring now to the drawings and particularly to FIG. 1, there is shown therein a perspective view of an exemplary reusable launch vehicle 10 which includes an exemplary embodiment of a sealing system of the present invention. The vehicle 10 includes two or more rocket nozzle thrust-directing structures 12 which are alternatively referred to herein as ramps. The propulsion and maneuvering of the vehicle is achieved by controllably directing thruster flow schematically represented by arrows 14, across the ramps 12. The vehicle includes a sealing system between adjacent engine ramps to prevent hot (approximately 4,000° F.) thrust gases from leaking through the gaps between adjacent ramps. The turbomachinery for supplying fuel to the rocket engines and other equipment is located behind these thrust-directing ramp structures. In addition, portions of oxygen and hydrogen fuel lines and tanks may extend into the areas within the vehicle behind these ramps. The exemplary sealing structure prevents hot thrust gas from reaching this critical hardware to avoid damage to these systems and loss of the vehicle during operation.

Figure 2:
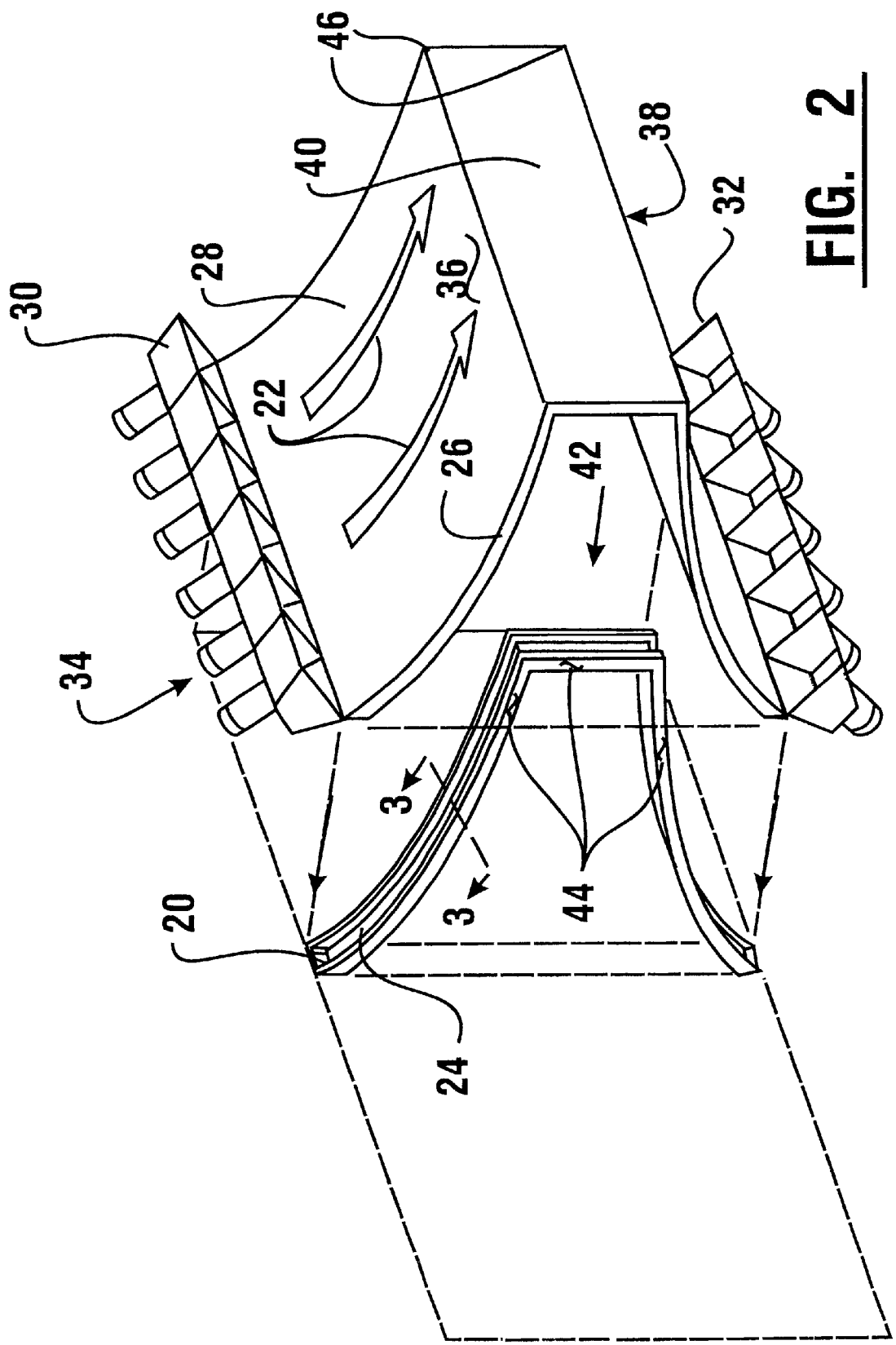
FIG. 2 is a perspective view of a ramp nozzle with thrust-directing structures employing a sealing system of an exemplary embodiment of the present invention.

FIG. 2 shows an exemplary sealing system 20 of the present invention which is operative to generally prevent hot thruster flow gases schematically represented by arrows 22 from leaking into the interior area of the vehicle between adjacent ramp structures. FIG. 2 further shows a multiple thruster outlet rocket engine module 34 and associated ramp structure prior to being installed in operating position. The engine module 34 includes a ramp structure 28 and thrusters 30, 32. The ramp includes two opposed generally convergent bounding walls 36 and 38 which converge toward a base 40. The thrusters 30, 32 are positioned adjacent the opposed bounding walls 36, 38 of the ramp structure 28 and are operative to direct thrust flow 22 across the thrust-directing portions of each of the bounding walls 36, 38 of the ramp structure 28.

The exemplary ramp structure 28 includes a peripherally extending edge wall portion 26. The edge wall portion 26 extends generally inward and normal to each of the bounding walls 36, 38 and the base wall 40. The exemplary sealing system 20 includes a channel 24 which has a shape which generally corresponds to the contour of the edge wall portion 26 of the ramp 28. In the exemplary embodiment the engine module 34 can be installed on the vehicle by relative movement along a longitudinal direction 42. The exemplary structure may be installed without requiring access to the channel area from behind the engine ramp 28. As will be further described, exemplary embodiments of the sealing system 20 may further include preloaded sealing elements positioned at locations 44 adjacent the outer walls bounding the channel 24. The sealing elements may be operative to biasingly engage the ramp structures during installation and eliminate the need to further access the seal prior to operation. This described exemplary embodiment of the sealing system is operative to seal against the inner surfaces of the base 40, corners 46, and bounding walls 36, 38 of the adjacent ramp structures as a single integrated package as the steps associated with the assembling of the engine ramps and the vehicle are performed.

Figure 3:
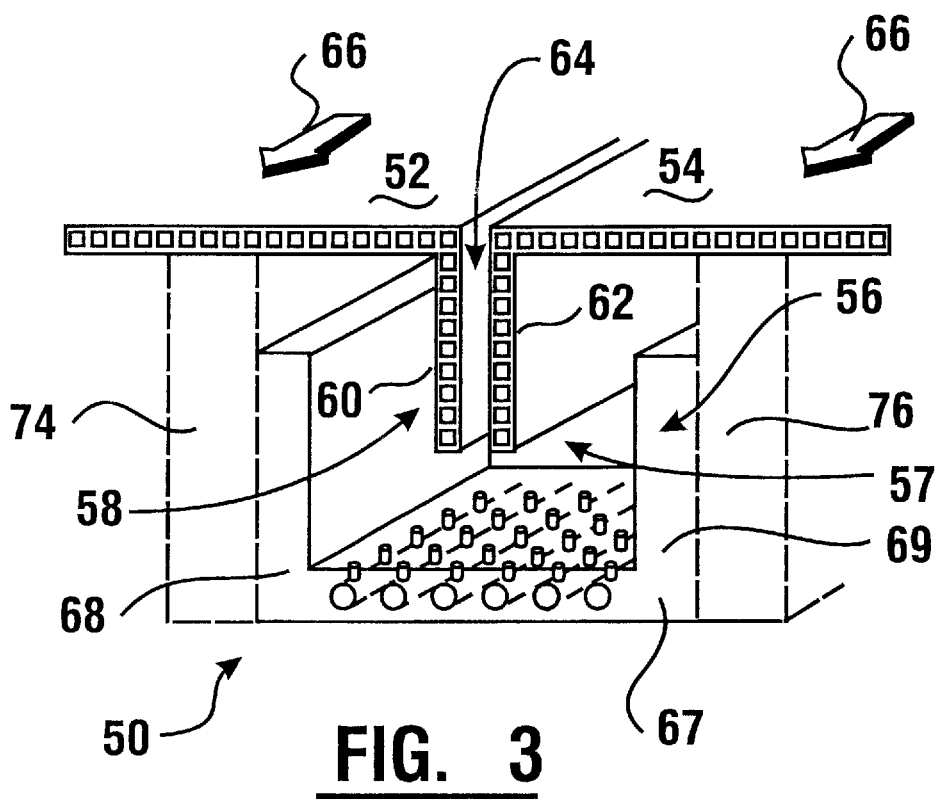
FIG. 3 is a cross-sectional view representative of adjacent thrust-directing structures in a uniform non-deflected orientation with respect to a channel along line 3—3 in FIGS. 1 and 2.

FIG. 3 shows a cross-section view along line 3—3 showing a portion 50 of the exemplary sealing system. A gap 64 extends between adjacent ramp structure portions 52, 54. A channel portion 56 defines an area or cavity 57 that is bounded in cross section by a base wall 67 and two opposed side walls 68, 69. The adjacent edges 58 of the ramp structure portions 52 and 54 include edge wall portions 60, 62. The edge wall portions extend from the bounding walls of the ramp portions 52, 54 into the cavity 57.

In operation of the vehicle, channel 56 captures hot gas leakage from thrust flow schematically represented by arrows 66, which passes over the thrust-directing outer surfaces of the ramp structures. The channel is operative to contain and direct the leakage flow away from hardware under the ramp structure portions 52, 54. The redirected flow passes in guided relation in the channel portion shown to an outlet which is defined by a gap between the adjacent base walls 40 of the ramp structures or other suitable outlet. The passage of hot gas through the outlet in the exemplary embodiment is in generally the same direction as gas flowing away from the thrust directing ramp portions. This adds to the overall engine thrust.

The exemplary embodiment of the sealing system may further include deformable sealing elements 74 and 76 located adjacent the walls 68, 69 of the channel 56. The sealing elements of the exemplary embodiment are implemented as pressure seals to generally prevent leakage between the channel 56 and the inner surface of the ramp structure portions 52, 54.

On the exemplary reusable launch vehicle, the outer surfaces of the ramp structures and the channels must be operative to withstand gas flow temperatures approaching 4000° F. without structural degradation. In exemplary embodiments, the channel 56 may be comprised of high temperature materials operative to withstand such high temperature gas flows. These high temperature materials may include for example monolithic or composite ceramic materials, carbon-carbon composites, carbon/silicon carbide, silicon nitride, silicon carbide, superalloy metals (Inconel or Waspalloy for example), oxide-dispersion strengthened metals, and gamma titanium aluminide. In exemplary embodiments the members comprising the channel may further be coated to provide the necessary degree of thermal and environmental resistance to oxidation, hydrogen reaction, and other reactions. In exemplary embodiments such coatings for example may include alumina, zirconia, yttria-stabilized zirconia, haffium carbide, hafnium diboride, silica, silicon nitride, and silicon carbide. In further exemplary embodiments, space shuttle ceramic tiles may also be applied to protect the channel structures.

Figure 4:
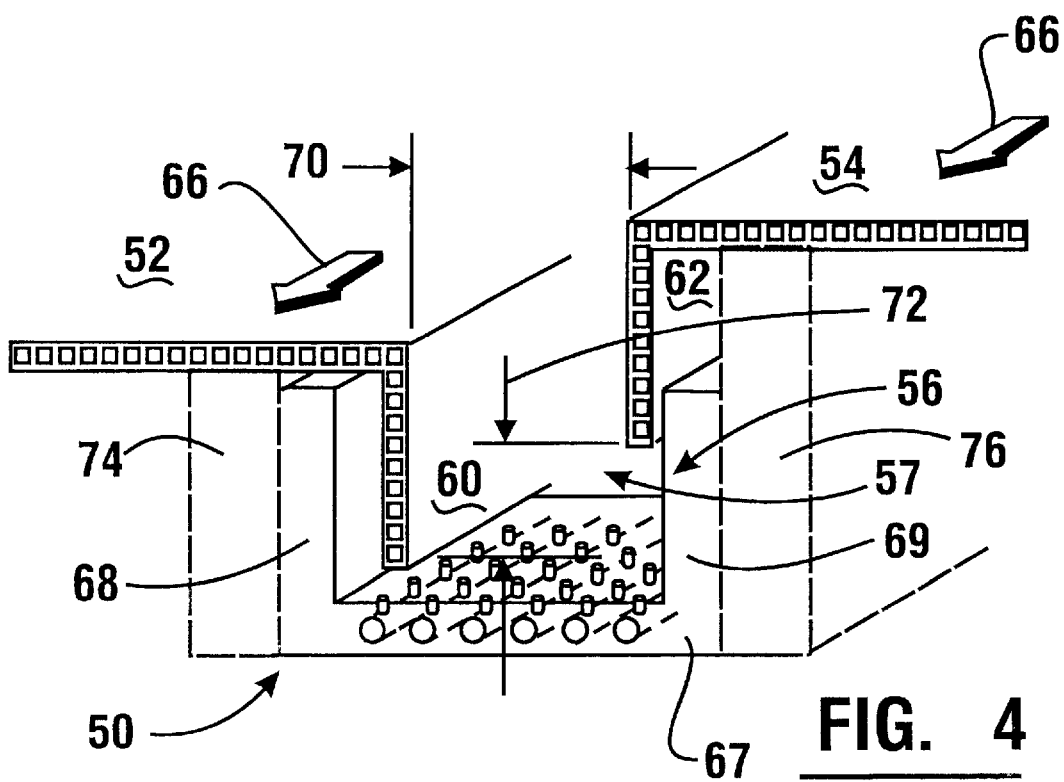
FIG. 4 is a cross-sectional view representative of adjacent thrust-directing structures in a translated orientation with respect to the channel.

The exemplary configuration of the channel 56 is operative to accommodate relatively large deflections or translations in the ramp structure portions 52, 54. FIG. 4 schematically shows the seal portion 50 in a condition in which both a relatively large in-plane deflection indicated 70 and an out-of-plane deflection indicated 72 of the ramp structure portions 52, 54 with respect to each other has occurred. In the exemplary embodiment the width and depth of the walls 67, 68, 69 of the channel 56 and the edge wall portions 60, 62 of the ramp structures are configured to accommodate the maximum relative deflection of the ramp caused by high thruster exhaust forces and thermal growth due to temperature variations. In exemplary embodiments during large relative movements of the ramp structure portions 52, 54, at least a portion of each of the edge wall portions 60,62 remains disposed extending between opposed walls 68, 69 of the channel 56. In exemplary thrust-directing ramp structures of a reusable launch vehicle, the clearances between the edge wall portions 60, 62 of the ramp structures and the walls of the channel 68, 69 may be sized to allow for several inches of displacement of the edge walls from a neutral position both in-plane and out-of-plane.

In exemplary embodiments, the sealing elements 74, 76 are deformable to biasingly engage adjacent structures in generally fluid tight relation. In some embodiments the sealing elements may in addition or alternatively be spring-biased and/or may be pneumatically biased to engage adjacent structures. In some embodiments pneumatic biasing may be achieved by directing relatively high pressure channel coolant gas into a cavity or otherwise so as to urge the sealing elements into engagement with adjacent structures. In other embodiments pneumatic biasing may alternatively or additionally be achieved by directing the relatively high-pressure thrust gas into a cavity or otherwise so as to engage and act against the sealing elements. In further exemplary embodiments, the sealing elements may include ceramic wafers, braided rope seals, plunger seals, and inflatable seals.

Figure 5:
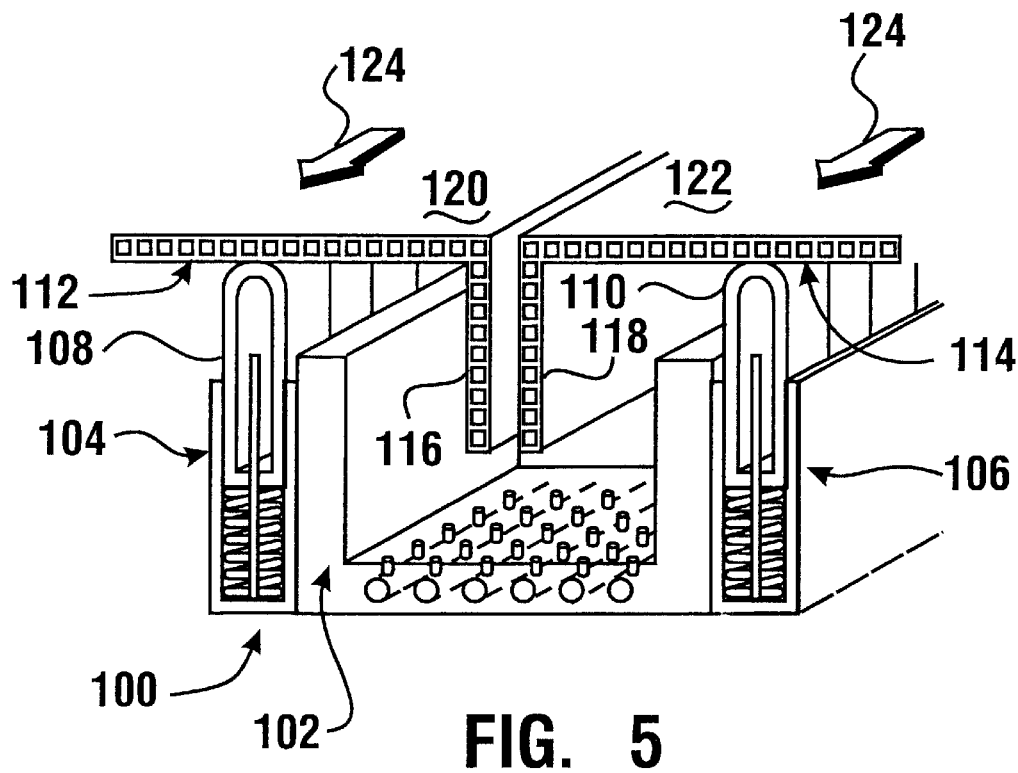
FIG. 5 is a cross-sectional view representative of spring biased sealing elements in sealing engagement with thrust directing structures in a non-translated orientation.

FIG. 5 shows an exemplary embodiment of a sealing system 100 comprised of a channel 102 and sealing elements 104, 106. The flow of hot thrust gas is represented by arrows 124. The sealing elements include spring biased plunger members 108, 110. The plunger members are biased into sealing engagement with the inside surfaces 112, 114 of ramp structures 120, 122. In addition the sealing elements 104, 106 are protected from hot gas impingement by the orientation of ramp edge walls 116, 118 which direct gas passing through the gap between the adjacent structures toward the bottom wall of the channel and away from the sealing elements.

In this exemplary embodiment, the sealing system 100 includes a plurality of independently movable plunger members located on each side of the channel 102. The plurality of plunger members are axially segmented in transverse cross section relative to the sealing direction and are relatively movable to correspond to the contour of the inner surfaces of the ramp structures. Also in the exemplary embodiment, the plunger members are movable so as to sealingly engage the ramps during engine installation and therefore do not require access to the seal members during or after installation.

Figure 6:
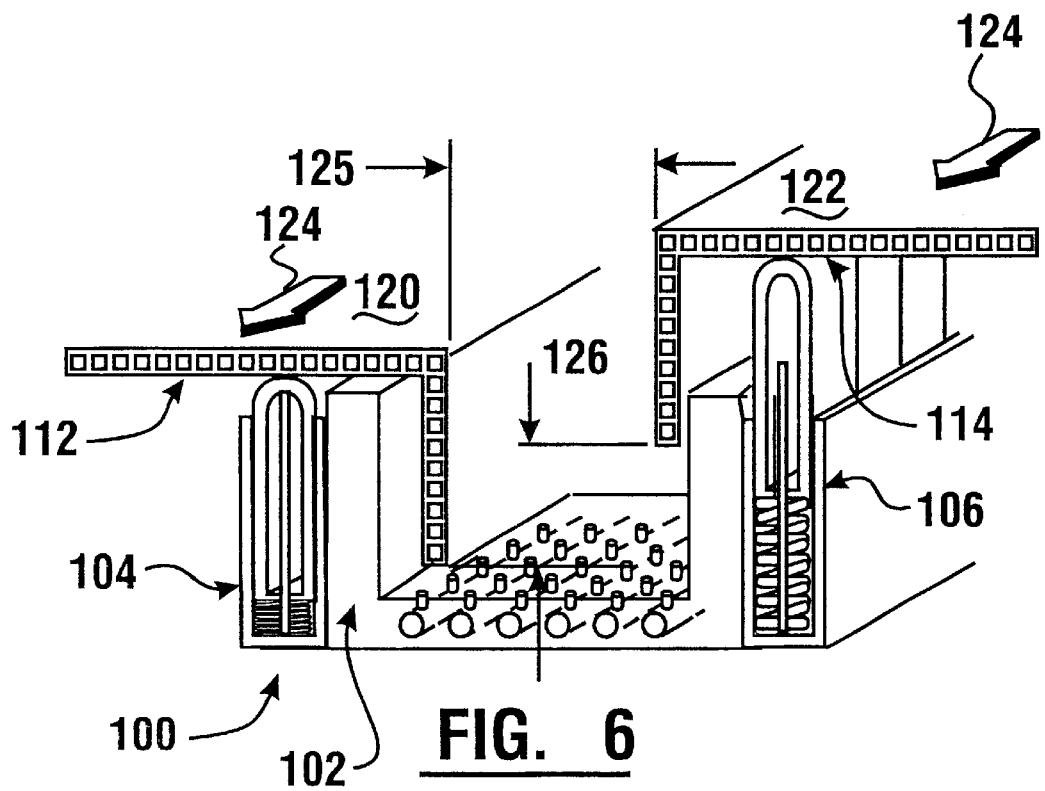
FIG. 6 is a cross-sectional view representative of spring biased sealing elements in sealing engagement with thrust directing structures in a translated orientation.

FIG. 6 shows the sealing system 100 after experiencing a relatively large in-plane deflection indicated 125 and out-of-plane deflection 126 of the ramp structures 120, 122. Here the plunger members 104, 106 have biasingly moved into retracted and extended positions responsive to the change in position of the inside surfaces 112, 114 of the ramp structures 120, 122. The exemplary plunger members 104, 106 are operative to accommodate the large in-plane and out-of-plane deflections of the ramp structures and further generally prevent gas from thruster flow 124 from reaching engine hardware and other components under the ramp structures 120, 122.

Figure 7:
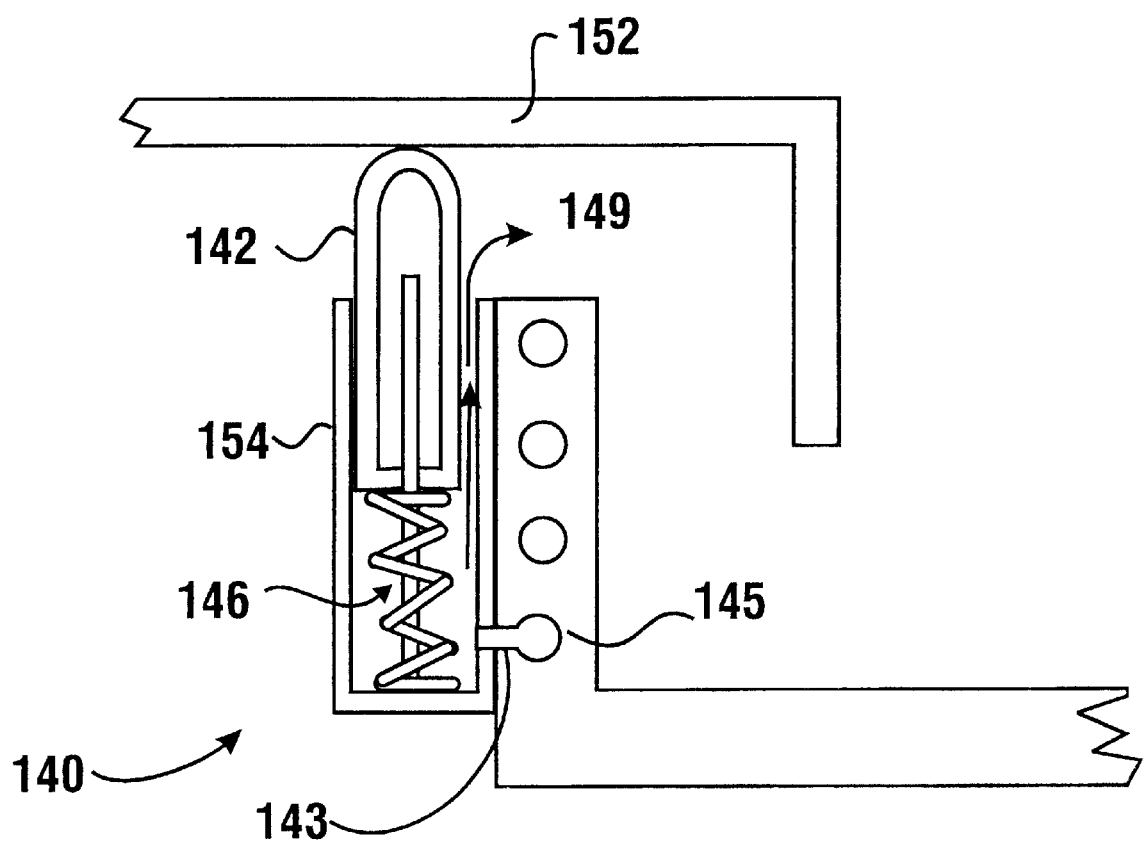
FIG. 7 is a cross-sectional view along line 3—3 of an embodiment including a spring biased sealing element which is further biased into sealing engagement by pressure derived from gases such as coolant gases in the cavity behind the plunger.

FIG. 7 shows a further exemplary embodiment of a sealing system 140. Here the sealing system 140 includes a spring biased sealing element plunger member 142. A fluid passage indicated 143 is in fluid communication with a channel coolant conduit 145. A cavity 146 beneath the plunger member 142 is in fluid communication with the gas pressure indicated in the channel coolant conduit 145. As indicated by arrow 149 the pressure in the cavity 146 acts to further bias the plunger member 142 into sealing engagement with the bounding wall of the ramp structure 152. In addition, in this exemplary embodiment the pressure associated with the gases in the cavity 146 is further operative to bias the plunger laterally into sealing engagement with an outer guide wall 154 which defines the area in which the plunger member is axially movable. As a result, gas in cavity 146 provides additional pressure for maintaining a generally fluid tight seal between the plunger member and the ramp structure and thereby helps to prevent thrust gases from reaching components within the vehicle. Furthermore, the coolant gas depicted by arrow 149 acts to cool the spring biased sealing elements including plunger member 142.

Figure 8:
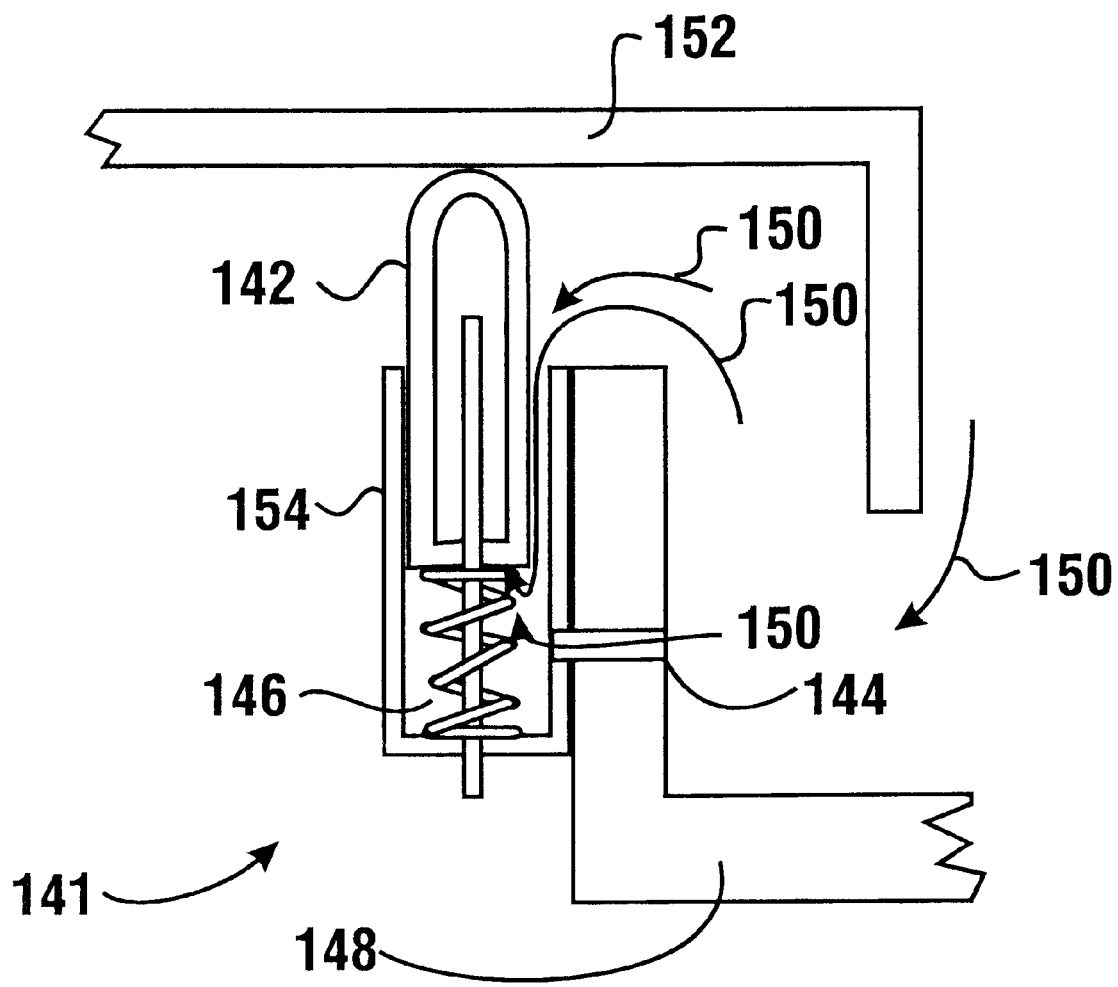
FIG. 8 is a cross-sectional view of an embodiment including a spring biased sealing element which is further biased into sealing engagement by pressure derived from thrust gases in the cavity behind the sealing element.

FIG. 8 shows a further exemplary embodiment of a sealing system 141 operating in a location where active cooling is not required. System 141 is similar to sealing system 140 except as otherwise indicated. Here the sealing system 141 includes a spring biased sealing element plunger member 142. A fluid passage indicated 144 is in fluid communication with a cavity bounded in cross section by channel 148. The cavity 146 beneath the plunger member 142 is in fluid communication with the gas pressure indicated in the channel 148. As indicated by arrows 150 the pressure in the channel 148 acts through the fluid passage 144 and is operative to further bias the plunger member 142 into sealing engagement with the bounding wall of the ramp structure 152. In addition, the pressure associated with the gases in the channel is further operative to bias the plunger laterally into sealing engagement with the outer guide wall 154 which defines the area in which the plunger member is axially movable. As a result, channel gases provide additional pressure for maintaining a generally fluid tight seal between the plunger member and the ramp structure and thereby prevent thrust gases from reaching components within the vehicle.

In exemplary embodiments of the invention, the sealing elements may be comprised of various high temperature materials depending on the requirements for the seal. For example, plunger members may be comprised of monolithic or composite ceramic materials, carbon-carbon composites, carbon/silicon carbide, silicon nitride, silicon carbide, superalloy metals (Inconel or Waspalloy, for example), oxide-dispersion strengthened metals, NiCrAlY alloys, platinum, oxide-dispersion strengthened platinum, gamma titanium aluminide, or other materials. Sealing elements comprising wafer seals may be comprised of high temperature monolithic or composite ceramic materials, alumina, silicon nitride, silicon carbide, carbon/carbon composites, or coated carbon SiC/carbon. Sealing elements comprising braided rope seals may be comprised of ceramic fibers (alumina-silica, alumina, silicon carbide, or Sylramic), superalloy wires, or carbon fibers. Of course in other embodiments other seal configurations and materials may be used.

Figure 9:
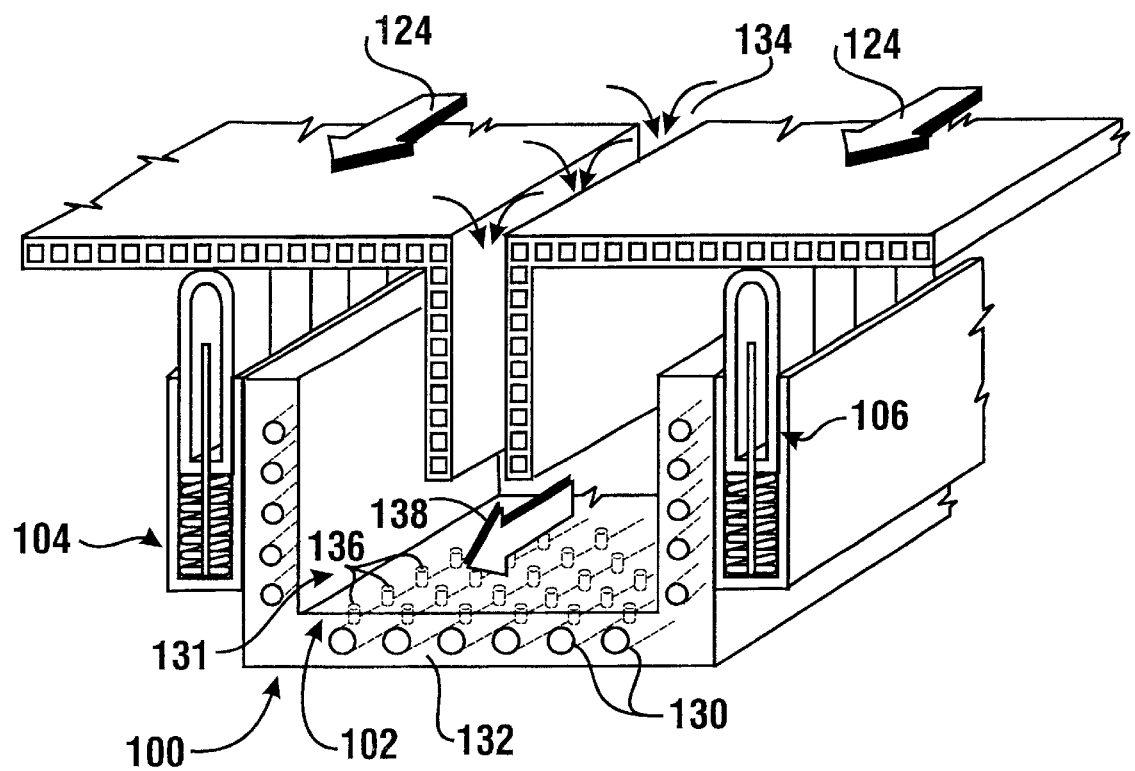
FIG. 9 is a cross-sectional view of an embodiment including cooling conduits and apertures in the channel which are operative to carry a coolant fluid for reducing the temperature of the sealing system.

As shown in FIG. 9, an exemplary embodiment of the sealing system 100 may further include a plurality of cooling tubes or conduits 130 running through the base 132 and/or other structures of the channel 102. The cooling conduits 130 may be operative to direct relatively lower temperature coolant gases through the base 132 or other areas of the channel for purposes of cooling the structures and for reducing the temperature of the hot gases 134 which flow into the cavity 131 bounded by channel 102. In further alternative exemplary embodiments, the channel base 132 may include holes or apertures 136 which place the cavity 131 of the channel 102 in fluid communication with the cooling conduits 130. The holes enable coolant gas to flow into the cavity 131 to mix with hot thrust gases 138. This enables further cooling of the hot gases 138 passing through the channel 102 and may serve to further protect the channel 102 and the secondary seals 104, 106 from damage. The cooling gases for example may be comprised of hydrogen gas, gas produced by a gas generator or relatively lower temperature exhaust gas produced by a device on the vehicle such as gas produced by turbomachinery which drives propellant pumps or other devices within the vehicle. In further alternative exemplary embodiments, coolant gases may be directly introduced into the channel 102 at the forwardmost locations of the channel. The flow rate and/or pressure of such coolant gas as it passes out of the apertures 136 may in some embodiments be sufficient to substantially prevent infiltration of thrust gas between the adjacent structures in addition to providing cooling effects.

Figure 10:
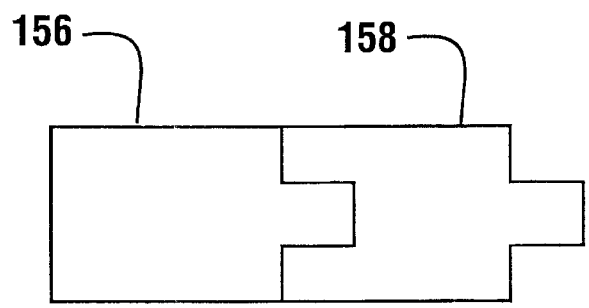
FIG. 10 is a cross sectional view of an embodiment in which adjacent segmented seal elements provide for movable interengagement.

In alternative embodiments other configurations of seal members may be used. For example FIG. 10 shows a plan view of a pair of interengaging segmented seal members 156, 158. Members 156 and 158 include an interengaging projection and recess. The interengaging projection and recess enable seal-members 156, 158 to move relative to one another in a manner similar to that previously described in connection with adjacent plunger members. The interengaging projections and recesses may provide additional lateral strength by distributing force loads between adjacent members. In addition the interengaging projections and recesses present a tortuous path which may provide greater resistance to fluid leakage between adjacent seal members. Of course the configuration of seal members 156, 158 is exemplary and in other embodiments other configurations employing such principles may be used.

Figure 11:
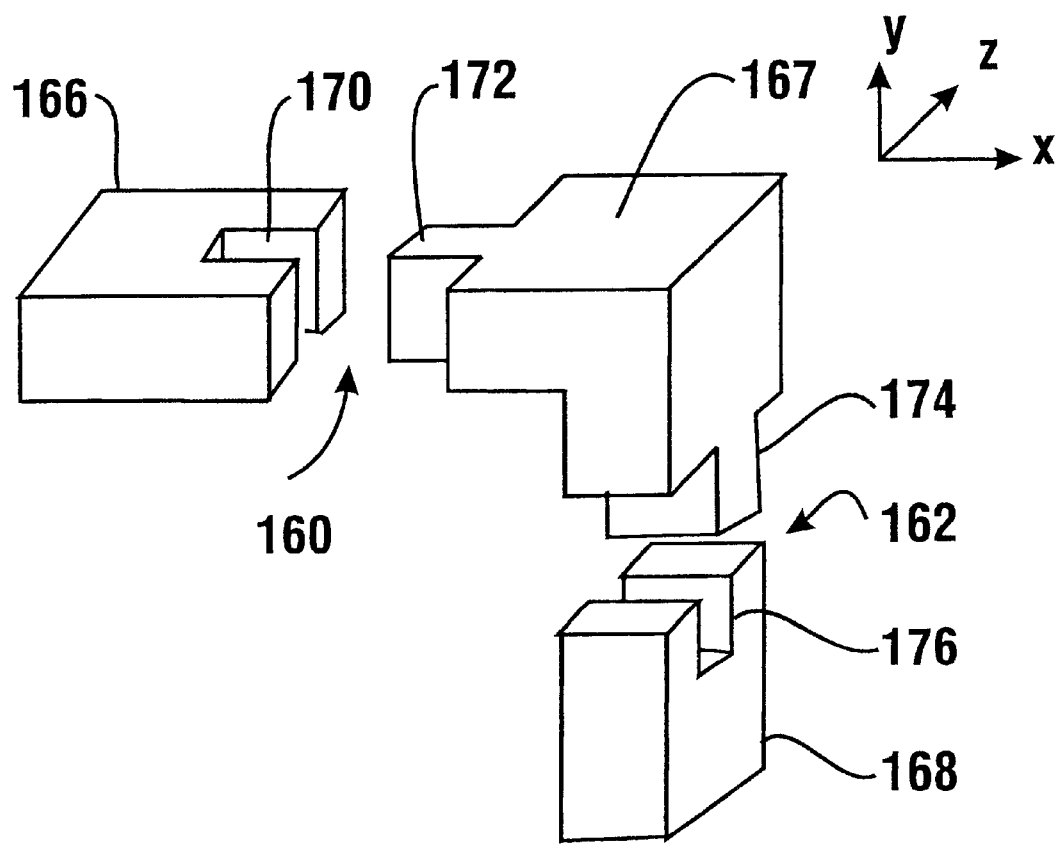
FIG. 11 is a perspective view showing an arrangement of exemplary sealing elements for sealing in a corner area of a thrust-directing structure.

Exemplary sealing systems of the present invention may be further operative to seal surfaces which include sharp angles or corners. FIG. 11 shows an isometric view of seal members 166, 167 and 168 which seal an inside corner of the ramp shown in FIG. 2. Here elements sealing the junction between the bounding wall 36 and the base 40 of a thrust-directing ramp are shown. To accommodate thermal expansion in the area of the corner, the sealing members in the area adjacent to the intersection between the bounding wall 36 and the base 40 include overlap joints 160, 162. Here a seal member 167 accommodates the angular shape of the corner while seal members 166, 168 engage the bounding wall 36 and base 40 of the ramp respectively. Movement of sealing member 167 in the direction of the Arrows X or Y is accommodated by overlap joints 160, 162 while a generally fluid tight engagement is maintained along the surfaces of these joints. Overlapping portions 170, 172 and 174, 176 are operative to slide relative to each other while maintaining sealing engagement with each other and the bounding wall and base during structural displacements. Transverse forces along the direction of Arrow Z whether due to pressure forces or structural displacements, tend to further resist any flow that might otherwise occur through the overlapping portions of the sealing elements. As a result, the sealing members maintain generally fluid tight engagement and enable gas to pass out of the channel through the outlet formed by the gap between the adjacent ramp structures. Of course these structures are exemplary and in other embodiments other approaches may be used.

Figure 12:
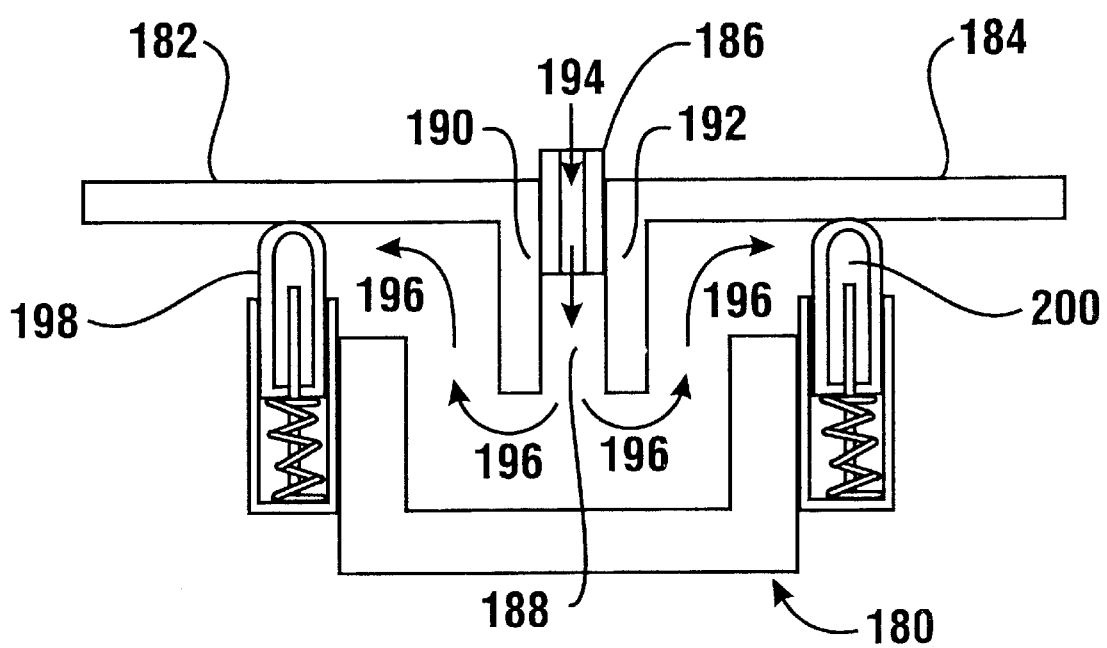
FIG. 12 is a cross sectional view of an embodiment of the sealing system undergoing testing for sealing integrity.

Referring now to FIG. 12, the integrity of an exemplary sealing system 180 similar to one or more of the embodiments previously described can be checked after adjacent ramp structures 182, 184 are installed on the vehicle or at other times prior or subsequent to operation of the thrusters. This may be accomplished using a resilient "boot" or other bridging structure 186 inserted into the gap 188 between the edge wall portions 190, 192 of the ramp structures. The same or other bridging structures may be used to generally close off fluid flow through channel outlets or other openings. Boot 186 includes one or more fluid passages 194 therethrough which allows a leak check of the sealing system 180 to be performed. Pressurized air or other test fluid may be supplied through the fluid passage 194 in the boot 186 or other passage as indicated by arrows 196 to pressurize the chamber bounded by the ramp structures 182, 184, and the boot 186 of sealing system 180. Leakage past the seal may be measured. Leakage at or below a pre-established level would be indicative that the secondary seals 198, 200 are in sealing contact with the inner surfaces of the ramp structures 182, 184 and that the sealing system is functioning within specified parameters. Such testing may be conducted prior to initiating operation or during shut down times between operating cycles. It should be understood that seal integrity may be tested by applying either positive or negative pressure so as to achieve a differential pressure relative to ambient. Seal integrity may be tested by measuring parameters such as pressure drop over time or fluid flow rates required to maintain a constant pressure. Of course these approaches to testing seal integrity are exemplary and other approaches and structures are encompassed by the present invention.

In addition to sealing the exemplary thrust driven vehicle engine ramps, exemplary forms of the sealing system of the present invention may also be applied to other moving structural interfaces in vehicle propulsion system joints such as ramps in variable exhaust systems, outlets of ramjet-scramjet engines, re-entry vehicle doors, landing gear doors, leading edge-to-wing attachment structures, and in sealing aerospace vehicle thermal protection system panels. In addition, exemplary embodiments of the present invention may further be used to seal interfaces in turbine engines including combustor cases, nozzle liners, and combustor-to-nozzle joints. Exemplary embodiments of the present invention may further be used in high temperature furnace expansion joints where furnace panel growth is encountered. Exemplary embodiments of the invention may also, be used to seal joints in high temperature molds or to seal locations in continuous casting processes.

Thus, the high temperature sealing system for large structural movements of the present invention achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations-herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:
1. A high temperature sealing system comprising:
   a channel comprised of a high temperature resistant material, wherein the channel includes a cavity bounded by a base wall and two opposed side walls, wherein the channel receives edge walls of two adjacent and spatially separated structures in the cavity between the two opposed side walls;
   a plurality of sealing elements in operative connection with each of the two opposed side walls, wherein when the edge walls of the adjacent structures are positioned between the two opposed side walls, the sealing elements are independently biasingly engaged with the adjacent structures and maintain relatively fluid tight sealing engagement with the adjacent structures during independent changes in position of the adjacent structures with respect to each other and the channel; and,
   wherein the two adjacent structures include thrust-directing ramp portions, wherein high temperature gas flows over the thrust-direction ramp portions, wherein each adjacent structure includes a bounding wall in operative connection with the edge wall, wherein each edge wall extends in a generally transverse direction to the bounding wall of its respective adjacent structure, and wherein the edge walls extend into the cavity and wherein the sealing elements biasingly contact the bounding walls of the adjacent structures.

2. The system according to claim 1, wherein the bounding walls do not extend in the cavity and wherein each of the sealing elements is independently biased to maintain contact with the bounding walls of the adjacent structures during changes in position of the adjacent structures that are both in-plane and out-of-plane with respect to each other.

3. The system according to claim 2, wherein the two opposed side walls are of sufficient height and width to maintain at least a portion of each of the edge walls extending within the channel upon displacement of the edge walls caused by forces resulting from thermal expansion and/or flow of high temperature gas acting on the bounding walls of the adjacent structures.

4. The system according to claim 3, wherein high temperature gas passes into the cavity between adjacent edge walls, and further comprising a coolant gas supply, wherein a coolant gas is delivered from the coolant gas supply into the cavity and wherein the coolant gas has a relatively lower temperature than the high temperature gas.

5. The system according to claim 4, wherein at least one of the base wall and opposed side walls includes at least one conduit, wherein the at least one conduit is operative to pass coolant gas therethrough.

6. The system according to claim 1, wherein the thrust-directing ramp portions include a contoured portion and wherein the channel is shaped to generally correspond with the ramp portions.

7. The system according to claim 6, wherein the thrust-directing ramp portions include the bounding wall, and wherein the sealing elements are segmented, and wherein the sealing elements biasingly move independently to conform to a contour of the bounding wall.

8. The system according to claim 6 and wherein high temperature gas flows into the cavity between the two edge wall portions extending within the channel, and wherein the channel includes an outlet, wherein gas exiting the outlet moves in a direction generally corresponding to thrust gas flowing from the thrust-directing ramp portions.

9. The system according to claim 8 wherein each adjacent structure includes a pair of convergent thrust directing ramp portions, and further comprising a pair of convergent channel portions extending between the adjacent structures, and wherein each channel portion has a plurality of adjacent sealing elements and includes an outlet, and wherein gas flowing from the outlet of each channel portion flows in generally the same direction as gas flowing away from the adjacent thrust-directing ramp portions.

10. The system according to claim 1, wherein the sealing elements comprise plunger members, wherein the plunger members are biased to maintain sealing engagement with the bounding walls of the adjacent structures.

11. The system according to claim 10, further comprising a fluid pressure source wherein the fluid pressure source is operative to urge the plunger members into sealing engagement with the bounding walls.

12. The system according to claim 11, further comprising at least one fluid passageway extending from the cavity, and wherein the at least one passageway is operative to cause fluid pressure in the cavity to act on the at least one plunger member to urge the at least one plunger member to maintain sealing engagement with the bounding walls of the adjacent structures.

13. The system according to claim 12, and further comprising a guide wall disposed away from and extending generally parallel to a side wall, and wherein at least one plunger member is movably positioned between the adjacent side wall and guide wall, wherein fluid pressure within the cavity is further operative to urge the at least one plunger between the adjacent side wall and guide wall into sealing engagement with the bounding wall and the guide wall.

14. The system according to claim 11 wherein the fluid pressure source comprises at least one cooling conduit in at least one of the walls bounding the channel.

15. The system according to claim 14 and further comprising at least one fluid passage extending fluidly intermediate of the cooling conduit and the cavity, wherein fluid from the cooling conduit flowing in the fluid passage is operative to cool the plunger members.

16. The system according to claim 15, wherein the channel further includes a plurality of apertures in at least one of the base wall and opposed side walls, and wherein the apertures are in fluid connection with the at least one cooling conduit, and wherein the apertures are operative to direct coolant gas to flow into the cavity wherein the coolant gas mixes with the high temperature gas.

17. The system according to claim 10, wherein the sealing elements are in operative connection with at least one spring, wherein the at least one spring is operative to urge the plunger members into sealing engagement with the bounding walls of the adjacent structures.

18. The system according to claim 1, wherein the channel is operative to withstand exposure to high temperature gas at up to 3000 degrees F. without structural degradation.

19. The system according to claim 1, wherein a one-piece body comprises base wall and the two opposed side walls.

20. The system according to claim 1, wherein the sealing elements include movable plunger members.

21. The system according to claim 1 wherein the channel is comprised of at least one of monolithic or composite ceramic material, carbon-carbon composite, carbon/silicon carbide, silicon nitride, silicon carbide, superalloy metal, oxide dispersion strengthened metal and gamma titanium aluminide.

22. A high temperature sealing system comprising:
a channel comprised of a high temperature resistant material, wherein the channel includes a cavity bounded by a base wall and two opposed side walls, wherein the channel is adapted to receive portions of two adjacent and spatially separated structures in the cavity between the two opposed side walls;
a plurality of sealing elements in operative connection with each of the two opposed side walls, wherein the sealing elements include ceramic wafers or braided rope seals, wherein when the portions of the adjacent structures are positioned between the two opposed side walls, the sealing elements are independently biasingly engaged with the adjacent structures and maintain relatively fluid tight sealing engagement with the adjacent structures during independent changes in position of the adjacent structures with respect to each other and the channel.

23. A high temperature sealing system comprising:
a channel including high temperature resistant tiles, wherein the channel includes a cavity bounded by a base wall and two opposed side walls, wherein the channel is adapted to receive portions of two adjacent and spatially separated structures in the cavity between the two opposed side walls;
a plurality of sealing elements in operative connection with each of the two opposed side walls, wherein when the portions of the adjacent structures are positioned between the two opposed side walls, the sealing elements are independently biasingly engaged with the adjacent structures and maintain relatively fluid tight sealing engagement with the adjacent structures during independent changes in position of the adjacent structures with respect to each other and the channel.

24. A high temperature sealing system comprising:
a channel comprised of material coated with at least one of alumina, zirconia, yttria-stabilized zirconia, hafnium carbide, hafnium diboride, silica, silicon nitride, silicon carbide and ceramic tile, wherein the channel includes a cavity bounded by a base wall and two opposed side walls, wherein the channel is adapted to receive portions of two adjacent and spatially separated structures in the cavity between the two opposed side walls;
a plurality of sealing elements in operative connection with each of the two opposed side walls, wherein when the portions of the adjacent structures are positioned between the two opposed side walls, the sealing elements are independently biasingly engaged with the adjacent structures and maintain relatively fluid tight sealing engagement with the adjacent structures during independent changes in position of the adjacent structures with respect to each other and the channel.

25. A high temperature sealing system comprising:
an apparatus, wherein the apparatus includes at least two adjacent structures, wherein the adjacent structures include a first adjacent structure and a second adjacent structure, wherein each of the adjacent structures include a fluid directing wall portion with an inner surface and an outer surface, wherein the outer surfaces of the adjacent structures are operative to withstand exposure to high temperature gas flow, wherein the adjacent structures include adjacent edge walls transversely oriented with respect to the outer surface of the adjacent structures and wherein a gap is formed between the adjacent edge walls; and
a channel extending along the gap, wherein the channel includes an elongated cavity bounded by two opposed side walls, and wherein portions of each of the edge walls extend in the cavity and wherein the channel further includes at least one first sealing element adjacent a first one of the side walls and at least one second sealing element adjacent a second one of the side walls, wherein portions of the first and second sealing elements are movable relative to the channel, and wherein the first sealing element is biased to maintain sealing engagement with the inner surface of the fluid directing wall portion of the first adjacent structure and the second sealing element is biased to maintain sealing engagement with the inner surface of the fluid directing wall portion of the second adjacent structure through a range of relative movements of the adjacent structures with respect to each other and the channel.

26. The system according to claim 25, wherein the adjacent structures and the channel are comprised of materials which withstand exposure to high temperature gas flows up to 3000 degrees F.

27. The system according to claim 25, wherein the range of relative movements includes a displacement of the edge walls with respect to each other by more than 1 inch.

28. The system according to claim 25 wherein each adjacent structure includes a pair of convergent fluid directing wall portions.

29. The system according to claim 25 wherein the at least one first sealing element comprises a plurality of segmented, interengaged relatively movable sealing elements.

30. The system according to claim 25 wherein at least one of the two adjacent structures comprises a corner, and wherein the at least one first sealing element comprises at least two relatively movable pieces adjacent the corner, wherein the at least two relatively movable pieces have surfaces in abutting relation that maintain relatively fluid tight engagement during relative movement of the pieces and the corner.

31. The system according to claim 25 and further comprising a removable bridging structure operative to seal the gap in generally fluid tight relation, whereby with the bridging structure in sealing relation of the gap, the sealing integrity of the at least one first sealing element and the at least one second sealing element is enabled to be tested by applying differential pressure between the channel and ambient.

32. A high temperature sealing system comprising:

an apparatus, wherein the apparatus includes a vehicle, wherein the apparatus includes at least two adjacent structures, wherein the adjacent structures include a first adjacent structure and a second adjacent structure, wherein the adjacent structures include thrust directing ramps, wherein each of the adjacent structures include a fluid directing wall portion with an inner surface and an outer surface, wherein the outer surfaces of the adjacent structures are operative to withstand exposure to high temperature gas flow, wherein the adjacent structures include adjacent edge walls transversely oriented with respect to the outer surface of the adjacent structures and wherein a gap is formed between the adjacent edge walls; and a channel extending along the gap, wherein the channel includes an elongated cavity bounded by two opposed side walls, and wherein portions of each of the edge walls extend in the cavity and wherein the channel further includes at least one first sealing element adjacent a first one of the side walls and at least one second sealing element adjacent a second one of the side walls, wherein portions of the first and second sealing elements are movable relative to the channel, and wherein the first sealing element is biased to maintain sealing engagement with the inner surface of the fluid directing wall portion of the first adjacent structure and the second sealing element is biased to maintain sealing engagement with the inner surface of the fluid directing wall portion of the second adjacent structure through a range of relative movements of the adjacent structures with respect to each other and the channel.

* * * * *